(12) United States Patent
Huai et al.

(10) Patent No.: US 6,973,028 B1
(45) Date of Patent: Dec. 6, 2005

(54) SONET RING MAP GENERATION METHOD AND SYSTEM

(75) Inventors: Jin Huai, Petaluma, CA (US); Show Chung Chin, Rohnert Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 862 days.

(21) Appl. No.: 09/861,114

(22) Filed: May 18, 2001

(51) Int. Cl.[7] .............................................. G01R 31/08
(52) U.S. Cl. .................... 370/222; 370/221; 370/242; 370/258
(58) Field of Search ................ 370/221, 222, 370/223, 216, 249, 242, 258, 254, 241, 245; 714/717

(56) References Cited

U.S. PATENT DOCUMENTS

| | | | | |
|---|---|---|---|---|
| 5,412,652 A | * | 5/1995 | Lu .............................. | 370/223 |
| 5,537,393 A | * | 7/1996 | Shioda et al. ................ | 370/223 |
| 5,805,568 A | * | 9/1998 | Shinbashi .................... | 370/223 |
| 6,377,374 B1 | * | 4/2002 | Davis et al. .................. | 398/82 |
| 6,456,587 B2 | * | 9/2002 | Taniguchi .................... | 370/216 |
| 6,614,754 B1 | * | 9/2003 | Usuba et al. ................ | 370/222 |
| 6,850,483 B1 | * | 2/2005 | Semaan ....................... | 370/218 |

OTHER PUBLICATIONS

RFC 2328 "OSPF Version 2" Ascent Communications, Apr. 1998, http://www.cls.ohio-state.edu/cgi-bin/rfc/rfc2328.html, 171 pages.
RFC 2370 "Internet RFC/STD/FYI/BCP Archives", http://www.landfield.com/rfcs/rfc2370.html, 11 pages.

* cited by examiner

*Primary Examiner*—Ajit Patel
*Assistant Examiner*—Steven A Blount
(74) *Attorney, Agent, or Firm*—Aka Chan LLP

(57) ABSTRACT

A method for generating a ring map for a bi-directional line switched ring. The method includes identifying a change in a provisioned bi-directional line switched ring and generating a ring map for both directions in the ring at a node of the ring. The generated ring maps are compared to determine if the change in the ring is a result of a link failure or a node change and the node's ring map is updated if there was a node change in the ring.

18 Claims, 7 Drawing Sheets

| NODE ID | EAST HOP COUNT | WEST HOP COUNT |
|---|---|---|
| D | 1 | 3 |
| B | 3 | 1 |
| C | 2 | 2 |

| EAST RING MAP INDEX = HOP COUNT | | WEST RING MAP INDEX = N - HOP COUNT | |
|---|---|---|---|
| INDEX | NODE ID | INDEX | NODE ID |
| 0 | A | 0 | A |
| 1 | D | 1 | D |
| 2 | C | 2 | C |
| 3 | B | 3 | B |

FIG. 5

| NODE ID | EAST HOP COUNT | WEST HOP COUNT |
|---|---|---|
| D | 1 | 0 |
| B | 0 | 1 |

| EAST RING MAP<br>INDEX = HOP COUNT ||  WEST RING MAP<br>INDEX = N - HOP COUNT ||
|---|---|---|---|
| INDEX | NODE ID | INDEX | NODE ID |
| 0 | A | 0 | A |
| 1 | D | 1 |  |
| 2 |  | 2 | B |

SONET RING MAP GENERATION METHOD AND SYSTEM

BACKGROUND OF THE INVENTION

The present invention relates generally to communications within a computer network, and more specifically, to ring provisioning within a communications network.

Communication in a computer network involves the exchange of data between two or more entities interconnected by communication links and subnetworks. Entities concerned primarily with the correct routing of information in the network are called routers, to distinguish them from end systems which process traffic but do not take part in routing it. There are two fundamentally different approaches to the distribution and use of routing information in a network, called Distance Vector Routing and Link State Routing. In the former, each router tells its immediate neighbors how it would reach each entity in the network, updating this as similar information is received from its neighbors. In the latter, each router arranges to send information about its own connectivity to its neighbors to all routers in the network. Each router then runs an algorithm called Shortest Path First (SPF) to find the best route from itself to each entity in the network. Early routing protocols (e.g., RIP) used the Distance Vector approach. Link State Routing protocols first appeared in the early 1980s, and became widely used in the Internet during the 1990s. OSPF (Open Shortest Path First) and Integrated IS—IS (Intermediate System—Intermediate System) are widely used examples of such protocols.

With link state routing, each router must discover its neighbors and learn their network addresses. A cost (typically related to the link bandwidth) is associated, generally by network management, with each link. One or more link state packets are then constructed containing this information, and flooded to all routers in the network. Dijkstra's Shortest Path First algorithm is then used at each router to find the shortest path to every other router. This algorithm maintains a set of nodes whose shortest path is already known and operates by adding one node to this known set with each iteration. The next step is to the next closest router along this path, always choosing the one which has the lowest cost from the local node. This process continues until all reachable nodes are in the known set with costs assigned to each.

SONET/SDH networks typically provide protection from failure by using topologies that dedicate half of the total bandwidth for protection. One type of SONET protection is bi-directional line switched ring (BLSR). The BLSR may be two-fiber or four-fiber. BLSR provides rapid restoration times with control logic. In a BLSR, traffic can be added and dropped at any node along a given ring. At the drop site, new traffic can be added to the previously used time slot and transported further around the ring. This re-use of bandwidth in a BLSR increases the capacity for the entire ring and provides many advantages over a unidirectional path switched ring (UPSR). If a fiber is cut in the BLSR, multiplexers have the speed to send the services affected via an alternate acceptable path through the ring without interruption.

When a BLSR is provisioned, each node in the BLSR has to know what other nodes are in the same ring. Traditionally, BLSR software receives a list of IP addresses that a local BLSR node discovered. In order to determine if there are any other BLSR nodes in the list, the local node has to send a message (e.g., UDP socket message) to each node and query it. Upon receiving the message, a BLSR node replies by sending a respond message back with a valid BLSR node ID. A non-BLSR node will also send a respond message back but with a non-ring-node-id. The software generates a BLSR ring map after it receives all of the replies.

In conventional systems, user intervention is typically required to determine whether a ring change is due to a real topology change (e.g., removal of a node) or a link failure (e.g., cut fiber).

There is, therefore, a need for a method and system for differentiating between link failure and node removal upon receiving a node failure indication within a network containing a BLSR to reduce the need for user intervention.

SUMMARY OF THE INVENTION

A method and system for generating a ring map for a bi-directional line switched ring are disclosed. The method generally comprises identifying a change in a provisioned bi-directional line switched ring and generating a ring map for both directions in the ring at a node of the ring. The generated ring maps are compared to determine if the change in the ring is a result of a link failure or a node change and the node's ring map is updated if there was a node change in the ring.

A system for generating a ring map for a bi-directional line switched ring generally comprises a processor operable to identify a change in a provisioned bi-directional line switched ring and generate a ring map for both directions in the ring at a node of the ring and memory configured to at least temporarily store the ring maps. The processor is configured to compare ring maps to determine if the change in the ring is a result of a link failure or a node change and update the node's ring map if there was a node change in the ring.

A computer program product for generating a ring map for a bi-directional line switched ring generally comprises computer code that identifies a change in a provisioned bi-directional line switched ring and generates a ring map for both directions in the ring at a node of the ring. The product further comprises computer code that compares the generated ring maps to determine if the change in the ring is a result of a link failure or a node change and updates the node's ring map if there was a node change in the ring. A computer readable medium is provided to store the computer codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

FIG. 5 is a table listing east and west ring maps for the BLSR of FIG. 3.

FIG. 8 is a table listing east and west ring maps for the BLSR of FIG. 6.

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
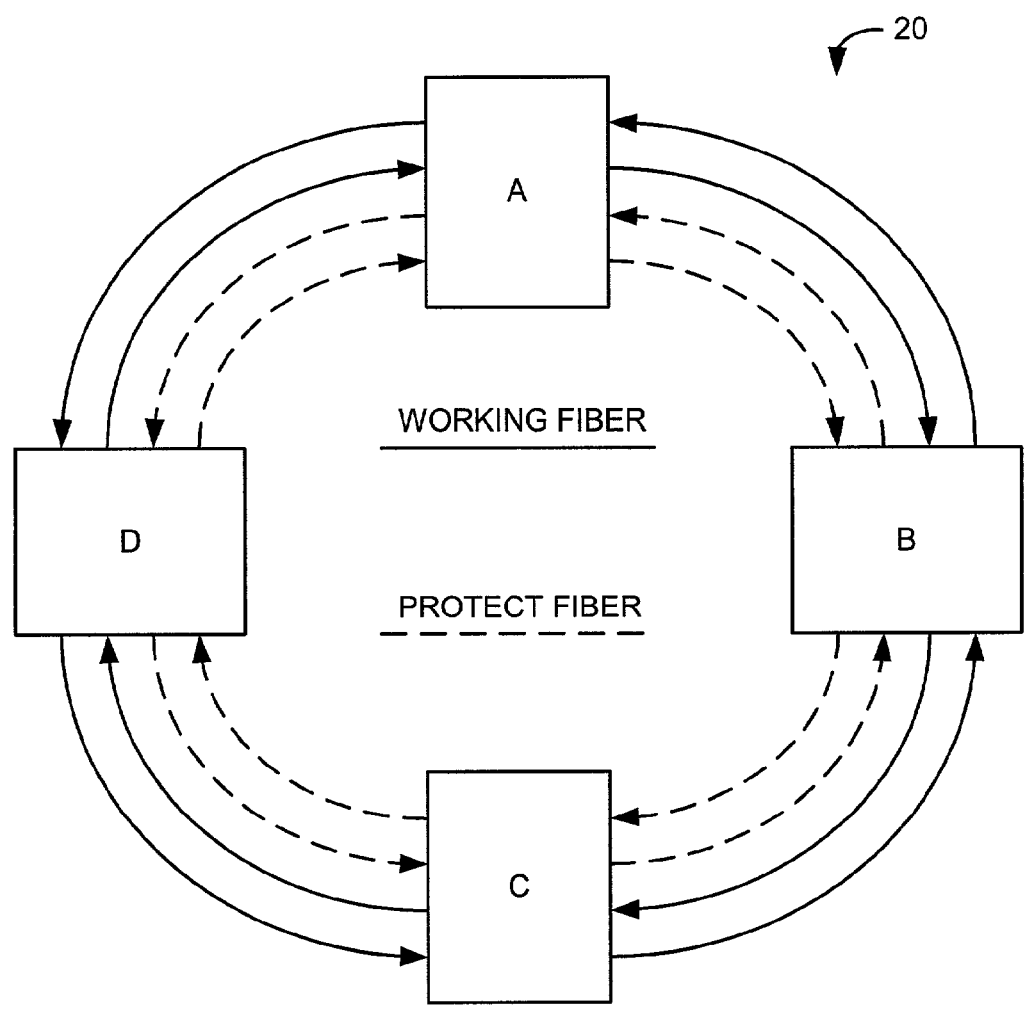
FIG. 1 is an example of a bi-directional line switched ring (BLSR).

Referring now to the drawings, and first to FIG. 1, a four-fiber BLSR SONET ring is shown, and generally indicated at 20. The BLSR contains four nodes A, B, C, D. The BLSR may be used, for example, in the backbone of a long haul network. The four fiber bi-directional line switching ring sends traffic only in the required direction during normal operation. The ring has a pair of working fibers (shown with solid lines) and a pair of protect fibers (shown with dashed lines). It is to be understood that the four-fiber BLSR is only provided as an example, and the present invention may be used with other configuration BLSRs such as a two-fiber BLSR.

The BLSR consists of multiple SONET nodes that connect into a ring topology. When a BLSR is provisioned, each node in the BLSR has to know what other nodes are in the same ring. To provision a BLSR, each node must be assigned with the same ring ID and unique node ID. Each node also has to know the ring map (i.e., what other nodes are on the same ring and their node IDs and hop counts). The ring map may need to be updated when there is a change in the ring. Changes occur, for example, when a node is removed from the ring or when temporary failure of a BLSR link occurs. It is important to distinguish a link failure from node removal since the ring map needs to be updated for node removal but not for link failure. In conventional systems, user intervention is typically required to differentiate between link failure and node removal. The present invention provides a method for identifying whether a ring change is due to a removed node or a link failure, thus, reducing the need for user intervention.

The present invention operates in the context of a data communication network including multiple network elements. Some of the nodes in a network that employs the present invention may be network devices such as routers and switches. For example, some of the nodes may be suitably configured routers such as those available from Cisco Systems, Inc. of San Jose, Calif. As used herein the term router is used to refer to devices that forward packets based on network and higher layer information. The router may include, for example, a master central processing unit (CPU), interfaces, and a bus. The CPU preferably includes memory and a processor. When acting under the control of appropriate software or firmware, the CPU is responsible for such router tasks as routing table computations, network management, and general processing of packets. It preferably accomplishes all of these functions under the control of software including an operating system (e.g., a version of the Internetwork Operating System (IOS®) of Cisco Systems, Inc.) and any appropriate applications software. The CPU may include one or more processors such as a processor from the Motorola family or microprocessors of the MIPS family of microprocessors. In an alternative embodiment, the processor is specially designed hardware for controlling the operations of the router. Memory may be non-volatile RAM or ROM. However, there are many different ways in which memory may be coupled to the system. In an alternative embodiment, a router or switch may be implemented on a general purpose network host machine such as the computer system of FIG. 2.

Figure 2:
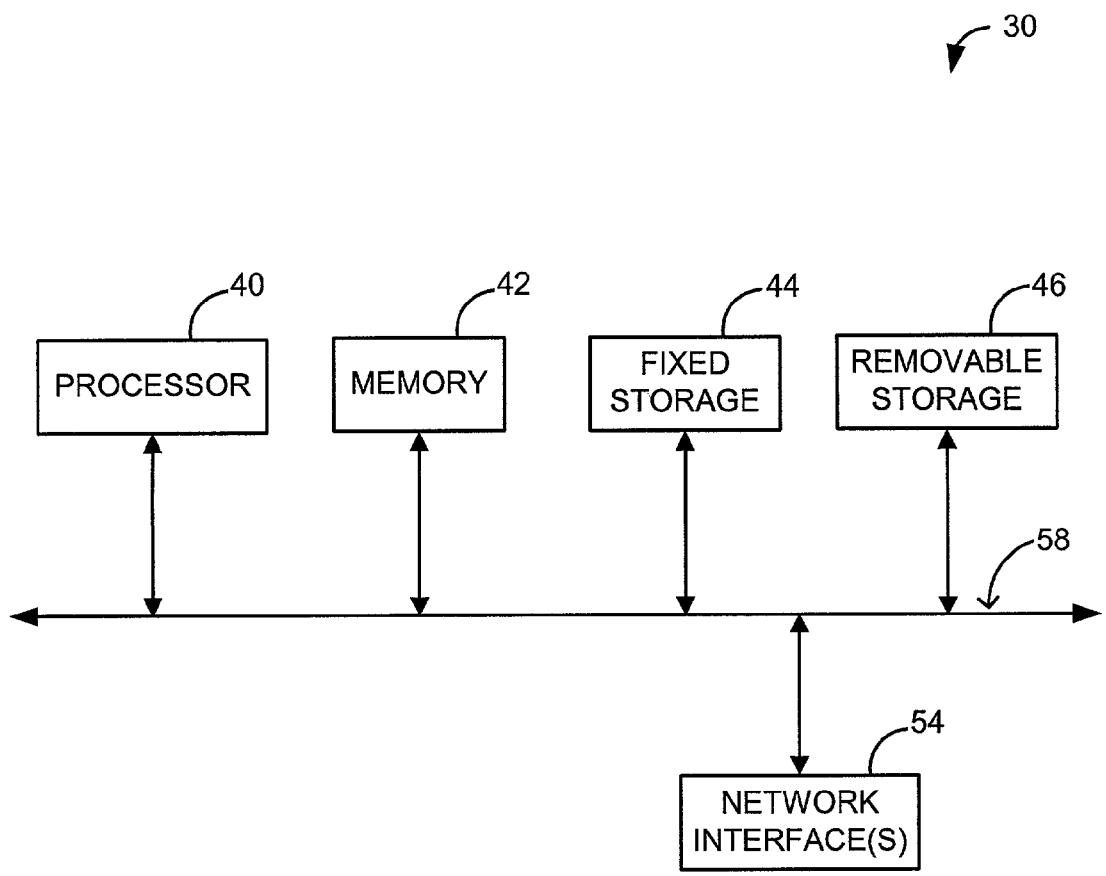
FIG. 2 is a block diagram illustrating an example of a computer system that can be utilized to execute software of an embodiment of the present invention.

FIG. 2 shows a system block diagram of computer system 30 that may be used to execute software of an embodiment of the invention. The computer system may include subsystems such as a central processor 40, system memory 42, removable storage 46 (e.g., CD-ROM drive), and a hard drive 44 which can be utilized to store and retrieve software programs incorporating computer code that implements aspects of the invention, data for use with the invention, and the like. The computer readable medium may also include floppy disk, zip disk, tape, flash memory, or system memory. Additionally, a data signal embodied in a carrier wave (e.g., in a network including the Internet) may be the computer readable storage medium. Other computer systems suitable for use with the invention may include additional or fewer subsystems. For example, the computer system may include more than one processor 40 (i.e., a multi-processor system) or a cache memory.

The system bus architecture of the computer system 30 is represented by arrows 58 in FIG. 2. However, these arrows are only illustrative of one possible interconnection scheme serving to link the subsystems. For example, a local bus may be utilized to connect the central processor 40 to the system memory 42. The components shown and described herein are those typically found in most general and special purpose computers and are intended to be representative of this broad category of data processors. The computer system 30 shown in FIG. 2 is only one example of a computer system suitable for use with the invention. Other computer architectures having different configurations of subsystems may also be utilized.

Communication between computers within the network is made possible with the use of communication protocols, which govern how computers exchange information over a network. The computer may include an input/output circuit used to communicate information in appropriately structured form to and from parts of the computer and associated equipment. Preferably, each of these interfaces includes a plurality of ports appropriate for communication with the appropriate media, and associated logic, and in some instances memory. The associated logic may control such communication intensive tasks as packet integrity checking and media control and management. The high speed interfaces are preferably multiport Ethernet interfaces, but may be other appropriate interfaces such as FDDI interfaces.

The routers facilitate the flow of data packets throughout the system by routing the packets to the proper receiving stations. The packet typically contains the address of the final destination station. The final destination address remains constant as the packet traverses the networks. A key function of the router is determining the next station to which the packet is sent. The routers typically execute routing algorithms to decide over which communication links incoming packets should be transmitted. A type of network layer routing protocol commonly employed by routers is a link state routing protocol. With link state routing, each router must discover its neighbors and learn their network addresses, measure the delay to each of its neighbors, construct a packet containing this information, send the packet to all other routers, and compute the shortest path to every other router.

When the router is booted, its first task is to learn who its neighbors are. It accomplishes this goal by sending a special HELLO packet on each point-to-point line. The router on the other end is expected to send back a reply telling who it is. Once the information needed for the exchange has been collected, the next step is for each router to build a packet containing all of this data. The packet (a Link State Packet) starts with the identity of the sender, followed by a sequence number, age, and a list of neighbors. For each neighbor, the cost to that neighbor, a network management parameter, is given. The link state database is synchronized by having the routers exchange LSPs to build the link state database. The routers flood the networks with LSPs, check integrity using a checksum, and resend the LSPs by forwarding them out on all enabled interfaces except the interface on which each was received or on which the same LSP has already been received. The router's link state database is thus a combination of the router's own adjacency database and the LSP, arriving from all other routers. When the link state database is complete, a copy of the database, which includes a map of the network and its links, services, and external routes for the area, is maintained in each router.

As discussed above, OSPF is a widely used protocol to carry link state information for IP routing purposes. OSPF is described in RFC 2328, OSPF Version 2, by J. Moy, dated April 1998, which is incorporated herein by reference in its entirety. Each router in the system maintains an identical link state database describing the system's topology. From this database, a routing table is calculated by constructing a shortest-path tree. The database includes a router's local state (e.g., the router's usable interfaces and reachable neighbors). The link state advertisement (LSA) is a unit of data describing the local state of a router or network. Each link state advertisement is flooded throughout the routing domain. The collected link state advertisements of all routers and networks forms the protocol's link state database. OSPF recalculates routes upon detection of a topology change, such as router interface failures.

Opaque LSA (Link State Advertisement) enhances the OSPF protocol so that it can carry extra link state information such as BLSR ring ID. Opaque LSAs include a standard LSA header followed by application-specific information. These application-specific information fields are used by OSPF. OSPF link-state database flooding mechanisms are used to distribute Opaque LSAs to all or a limited portion of the OSPF topology. Opaque LSA is described in RFC 2370, The OSPF Opaque LSA Option, by R. Coltun, dated July 1998, which is incorporated herein by reference in its entirety.

The following describes a method for discovering all nodes in a BLSR ring based on the BLSR information carried in the OSPF Opaque LSA. This information is used to generate ring maps which can be used to determine if the change in the ring is due to a node removal or link failure. The method of the present invention provides both hop counts from the east and west directions. This allows east and west ring map generation by a BLSR state machine. A new ring map is updated only if the east and west ring maps agree with one another.

An example of the packet format of the Opaque LSA is as follows:
```
struct opq10_ink {
    byte myNodeId [4];
    byte nbrNodeId [4];
    byte myIfIndex [4];
    byte nbrIfIndex [4];
    byte myEntIndex [4];
    byte nbrEntIndex [4];
    byte blsrNodeId;
    byte flags;
    byte blsrRingId [2];}
```

The last 3 bits of the flags are for protection type: 0 for 2-fiber BLSR and 4 for 4-fiber BLSR. The last field (blsrRingId) carries the ID of the ring to which this link belongs. This ring ID is unique within the autonomous network. The rest of the fields are described in U.S. patent application Ser. No. 09/478,287, filed Jan. 5, 2000, which is incorporated herein by reference in its entirety.

The following is an example of code for an algorithm that may be used to generate the BLSR map. Each node data structure has two entries for hop counts.

```
for (each BLSR link of the local node){
    ringId = blsrRingId of the link;
    parent = local node;
    hopCnt = 1
    while (true) {
        n = the neighbor node of the link;
        add n to the ring map for ring id ringId;
        save the hopCnt;
        hopCnt = hopCnt + 1;
        if (found a BLSR link with same ringId of n whose neighbor is not
        the local node nor the parent)
            parent = n;
        else
            break the while loop;}}
```

After the first loop of the above routine is completed, the ring map contains all nodes in the BLSR ring. If every link of the ring is up and working, each node (except the local node) should have two hop counts in two directions (e.g., east and west) from the local node. If one node has only one hop count, the ring has at least one link down. Generation of a ring map from the above algorithm is described in the following examples. An example of a ring with no link failures and the associated ring maps are described below with respect to FIGS. 3, 4, and 5, and an example of a ring containing link failures and the associated ring maps are described below with respect to FIGS. 6, 7, and 8. The process of the above algorithm is also described in the flowchart of FIG. 9.

Figures 3, 4:
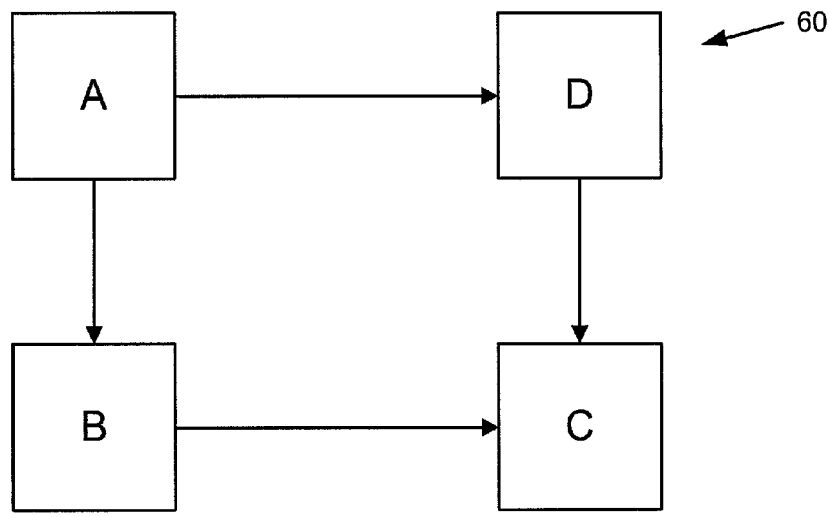
FIG. 3 is a schematic of a four node BLSR with no link failures.
FIG. 4 is a route table for node A of the BLSR of FIG. 3.

FIG. 3 illustrates an example of a BLSR 60 containing four nodes (A, B, C, D) and no link failures. The route table 70 at node A is shown in FIG. 4. Node A is defined as the parent or local node for the first time through the 'for loop' in the above algorithm. The second column in the table contains east hop counts. When the hop count equals one (n=1), the neighbor node of the link is node D. The hop count is then increased by one (n=2) and the neighbor node is node C. When the hop count is n=3, the neighbor node is node B. This is repeated to obtain the west hop counts (shown in third column in route table 70 of FIG. 4). In the west direction, node B has one hop count from parent node A, node C has two hop counts, and node D has three hop counts.

FIG. 5 shows the east and west ring map 74 generated from the route table 70 at node A (FIG. 4). For the east ring map, the index is set equal to the hop count. The index at the local node is index=0. For the west ring map, the index is set equal to N-hop count, where N=total node count in ring (i.e., N=4 for ring of FIG. 3). As shown in FIG. 4, the east and west maps are in agreement, thus the ring map should be updated.

Figures 6, 7:
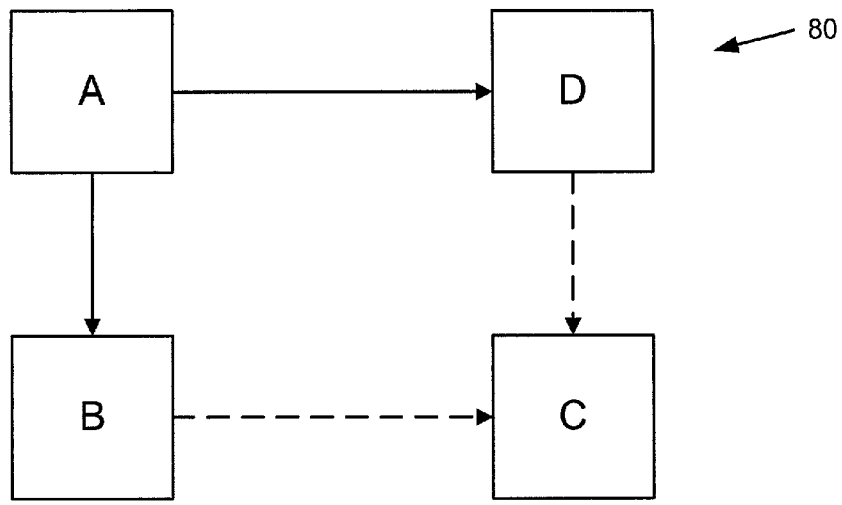
FIG. 6 is a schematic of a four node BLSR with two link failures.
FIG. 7 is a route table for node A of the BLSR of FIG. 6.

FIGS. 6, 7, and 8 illustrate ring map generation for a ring having a link failure. FIG. 6 shows ring 80 which has two link failures, one between nodes B and C, and another between nodes C and D. A route table 84 at node A is shown in FIG. 7. In the east direction (second column of FIG. 7) node D is reached when the hop count is equal to one. Node B cannot be reached from node A in the east direction due to the link failures between nodes D and C, and between nodes C and B. In the west direction (third column of FIG. 7) node B is reached from node A when the hop count is equal to one. Node D cannot be reached from node A in the west direction due to the link failures between nodes B and C, and between nodes C and D.

FIG. 8 shows the east and west ring map 86 generated for the ring 80 of FIG. 6. The total node count in the ring (N) is equal to three. The index for the east ring map is equal to the hop count. The index for the west ring map is equal to N-hop count. As described above, the index is equal to zero for the local node A. As shown in FIG. 8, the east and west map are not in agreement, thus a ring map update should not occur.

Figure 9:
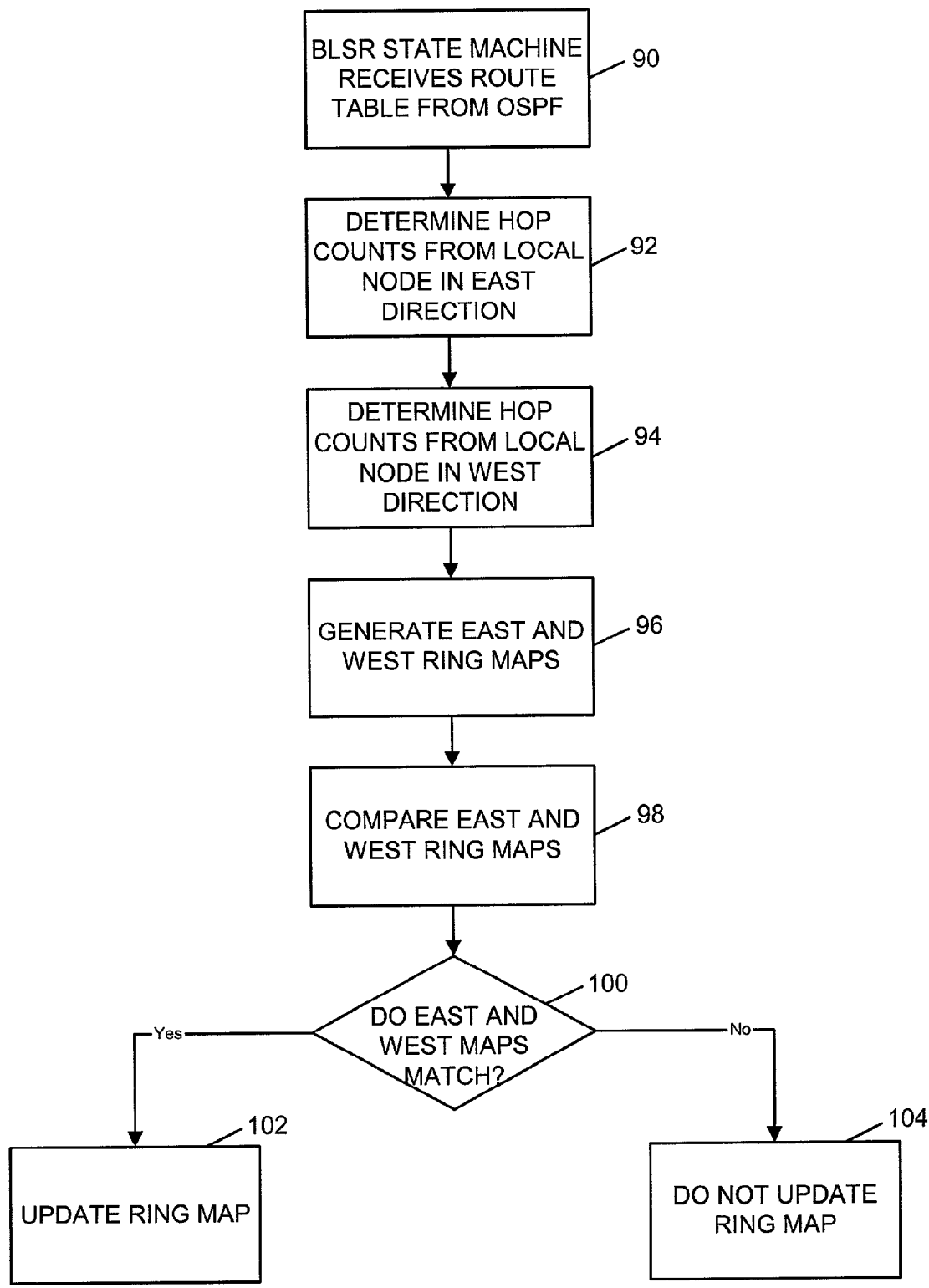
FIG. 9 is a flowchart illustrating a process of the present invention.

FIG. 9 is a flowchart illustrating the process described above. At step 90 the BLSR state machine receives a route table from OSPF. The hop count is determined from local node in the east direction (step 92). The hop count is then determined from the local node in the west direction (step 94). The east and west ring maps are generated at step 96. The east and west ring maps are then compared (step 98). If the east and west maps match, the ring map is updated (steps 100 and 102). If the east and west ring maps do not agree, the ring map is not updated (steps 100 and 104).

As can be observed from the foregoing, the BLSR map generation method and system of the present invention have many advantages. The method and system provide for reliable ring map generation to reduce the need for user intervention. When a BLSR state machine receives a new route table from OSPF, it can be determined whether the change is due to a real topology change or link failure.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for generating a ring map for a bi-directional line switched ring, the method comprising:
    identifying a change in a provisioned bi-directional line switched ring;
    generating a ring map for both directions in the ring at a node of the ring, a ring map for each direction including hop counts of other nodes from the node of the ring;
    comparing the generated ring maps to determine if the change in the ring is a result of a link failure or a node change; and
    updating the node's ring map if there was a node change in the ring.

2. The method of claim 1 wherein identifying a change in a provisioned bi-directional line switched ring comprises receiving a route table from OSPF.

3. The method of claim 1 wherein the route table is received at a BLSR state machine.

4. The method of claim 1 wherein generating a ring map comprises receiving information from an opaque LSA.

5. The method of claim 4 wherein information received from the opaque LSA includes a BLSR ring ID.

6. The method of claim 4 wherein a packet format of the opaque LSA includes an ID of the ring to which a link belongs.

7. A system for generating a ring map for a bi-directional line switched ring, the system comprising:
    a processor operable to identify a change in a provisioned bi-directional line switched ring and generate a ring map for both directions in the ring at a node of the ring, a ring map for each direction including hop counts of other nodes from the node of the ring; and
    memory configured to at least temporarily store the ring maps;
    wherein the processor is configured to compare ring maps to determine if the change in the ring is a result of a link failure or a node change and update the node's ring map if there was a node change in the ring.

8. The system of claim 7 wherein the processor is configured to receive link state information from OSPF.

9. The system of claim 7 wherein the processor is configured to receive BLSR ring ID information from an opaque LSA.

10. A computer program product for generating a ring map for a bi-directional line switched ring, the product comprising:
    computer code that identifies a change in a provisioned bi-directional line switched ring;
    computer code that generates a ring map for both directions in the ring at a node of the ring, a ring map for each direction including hop counts of other nodes from the node of the ring;
    computer code that compares the generated ring maps to determine if the change in the ring is a result of a link failure or a node change;
    computer code that updates the node's ring map if there was a node change in the ring; and
    a computer readable medium that stores the computer codes.

11. The computer program product of claim 10 wherein the computer readable medium is selected from the group consisting of CD-ROM, floppy disk, zip disk, tape, flash memory, system memory, hard drive, and data signal embodied in a carrier wave.

12. The computer program product of claim 10 further comprising code that receives opaque LSAs.

13. An apparatus for generating a ring map for a bi-directional line switched ring, the apparatus comprising:
    means for identifying a change in the provisioned bi-directional line switched ring;
    means for generating a ring map for both directions in the ring at a node of the ring, a ring map of each direction including hop counts of other nodes from the node of the ring;
    means for comparing the generated ring maps to determine if the change in the ring is a result of a link failure or a node change; and
    means for updating the node's ring map if there was a node change in the ring.

14. The apparatus of claim 13 wherein the means for generating a ring map comprises means for receiving information from an opaque LSA.

15. The apparatus of claim 14 wherein information received from the opaque LSA includes a BLSR ring ID.

16. The apparatus of claim 14 wherein a packet format of the opaque LSA includes an ID of the ring to which a link belongs.

17. The apparatus of claim 13 further comprising means for receiving routing information through OSPF at the node of the bi-directional line switched ring.

18. The apparatus of claim 17 wherein the routing information is a route table received at a BLSR state machine.

* * * * *